United States Patent
Neelakantan et al.

(10) Patent No.: US 8,596,440 B2
(45) Date of Patent: Dec. 3, 2013

(54) ENGINE START STOP APPLICATIONS FOR SOLENOID PUMPS

(75) Inventors: Vijay A. Neelakantan, Rochester Hills, MI (US); Kevin Michael Dougan, Plymouth, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 13/017,911

(22) Filed: Jan. 31, 2011

(65) Prior Publication Data

US 2012/0193188 A1    Aug. 2, 2012

(51) Int. Cl.
*F16H 61/00* (2006.01)
*F16D 48/06* (2006.01)

(52) U.S. Cl.
USPC ........................................ 192/85.63; 475/116

(58) Field of Classification Search
None
See application file for complete search history.

(56) References Cited

U.S. PATENT DOCUMENTS

| | | | | |
|---|---|---|---|---|
| 3,135,087 A | * | 6/1964 | Ebert | 60/464 |
| 5,941,270 A | * | 8/1999 | Nogle | 137/112 |
| 2004/0159520 A1 | * | 8/2004 | Anwar et al. | 192/70.12 |
| 2009/0301588 A1 | | 12/2009 | Shimizu et al. | |
| 2010/0018829 A1 | * | 1/2010 | Neelakantan et al. | 192/12 C |
| 2010/0028168 A1 | | 2/2010 | Shimizu et al. | |
| 2010/0163360 A1 | * | 7/2010 | Fujii et al. | 192/3.33 |

* cited by examiner

*Primary Examiner* — Rodney Bonck

(57) ABSTRACT

A solenoid pump and associated hydraulic circuitry are intended for use in automatic transmissions capable of engine start stop (ESS) operation. In a first embodiment, a solenoid pump provides pressurized hydraulic fluid to respective inputs of two way check valves. The other inputs are provided with controlled hydraulic fluid from a transmission valve body. The outputs of the check valves are provided to those hydraulically operated torque transmitting devices associated with first gear. The solenoid pump is activated when the transmission is in gear and the engine is stopped to maintain hydraulic pressure in those actuators associated with first gear. A second embodiment provides hydraulic fluid to actuators associated with reverse. A third embodiment includes a solenoid pump and latching solenoid valve both communicating with a hydraulic supply In a fourth embodiment, a solenoid pump provides hydraulic fluid to the exhaust backfill circuits of hydraulic operators in an automatic transmission.

18 Claims, 4 Drawing Sheets

ENGINE START STOP APPLICATIONS FOR SOLENOID PUMPS

FIELD

The present disclosure relates to pumps for maintaining pressure in hydraulic systems of automatic transmissions during the stop phase of engine start stop (ESS) operation and more particularly solenoid pumps and hydraulic circuits for maintaining pressure in hydraulic torque transmitting devices of automatic transmissions during the stop phase of engine start stop (ESS) operation.

BACKGROUND

The statements in this section merely provide background information related to the present disclosure and may or may not constitute prior art.

One of the many operational schemes for passenger cars and light trucks that is under extensive study and development in response to ever increasing consumer demands and federal mileage requirements is referred to as engine start stop (ESS). This operational scheme generally involves shutting of the gasoline, Diesel or flex fuel engine whenever the vehicle is stopped in traffic, that is, whenever the vehicle is in gear but stationary for longer than a short, predetermined time, such as occurs at a traffic light.

While this operational scheme has a direct and positive impact on fuel consumption, especially for vehicles driven in cities and suburbs, it is not without complications from an engineering standpoint. For example, since the engine output/transmission input shaft does not rotate during the stop phase, automatic transmissions relying for their operation upon pressurized hydraulic fluid may temporarily lose pressure and thus gear and clutch selection and control. This shortcoming can, however, be overcome by incorporating hydraulic accumulators in the hydraulic control circuit at strategic locations. Alternatively, electrically driven gear and vane pumps may be incorporated into the transmission's hydraulic circuit to provide the required minimum pressure and flow while the engine is off. Both of these approaches have been utilized successfully.

It is apparent, however, that both of the above-recited solutions comprehend the incorporation of additional components which add both to the weight and cost of the transmission and vehicle drive train. Accordingly, it is also apparent that improvements directed to the problem of maintaining hydraulic flow and pressure in an automatic transmission during periods of engine inactivity in ESS applications are both desirable and worthwhile. The present invention is so directed.

SUMMARY

The present invention provides an electromagnetic solenoid pump and associated hydraulic circuitry for use in an automatic transmission associated with an engine start stop (ESS) drive train. In a first embodiment, a solenoid pump provides pressurized hydraulic fluid (transmission oil) to respective inputs of one or more two way check valves. The other inputs are provided with controlled hydraulic fluid from the transmission valve body. The outputs of the check valves are provided to respective hydraulically operated torque transmitting devices such as clutches or brakes associated with first gear. The solenoid pump is activated when the transmission is in gear and the engine or prime mover is stopped to maintain hydraulic pressure on the torque transmitting devices in order that a vehicle launch in first gear may be quickly and smoothly achieved when the engine is restarted.

In a second embodiment, similar to the first embodiment, a solenoid pump and one or more two way check valves provide pressurized hydraulic fluid from either one or more outputs of the valve body or the solenoid pump to respective hydraulic actuators associated with torque transmitting devices which achieve or engage reverse gear.

A third embodiment includes a solenoid pump, a pressure sensor and a latching solenoid all communicating with a hydraulic circuit between a variable output solenoid and a hydraulic actuator associated with a torque transmitting device in an automatic transmission which maintains actuator pressure by compensating for or overcoming leakage of the hydraulic components when the transmission is in gear and the engine is stopped.

In a fourth embodiment, a solenoid pump provides pressurized hydraulic fluid to the exhaust backfill circuit of one or more hydraulic actuators of torque transmitting devices in an automatic transmission when the transmission is in gear and the engine is stopped.

Thus it is an aspect of the present invention to provide a solenoid pump to maintain pressure in hydraulic circuits in an automatic transmission utilized in an engine start stop (ESS) application when the engine is stopped and the transmission is in gear.

It is a further aspect of the present invention to provide a hydraulic circuit for an automatic transmission utilized in an engine start stop application having a solenoid pump and one or more two way check valves which supply pressurized hydraulic fluid to respective hydraulic actuators from either the solenoid pump or the transmission valve body.

It is a still further aspect of the present invention to provide a hydraulic circuit for an automatic transmission utilized in an engine start stop application having a solenoid pump and one or more two way check valves which supply pressurized hydraulic fluid to respective hydraulic actuators associated with first gear from either the solenoid pump or the transmission valve body.

It is a still further aspect of the present invention to provide a hydraulic circuit for an automatic transmission utilized in an engine start stop application having a solenoid pump and one or more two way check valves which supply pressurized hydraulic fluid to respective hydraulic actuators associated with reverse gear from either the solenoid pump or the transmission valve body.

It is a still further aspect of the present invention to provide a hydraulic circuit for an automatic transmission utilized in an engine start stop application having a solenoid pump and one or more two way check valves which supply pressurized hydraulic fluid to respective hydraulic actuators from the solenoid pump during engine off periods when the transmission is in gear.

It is a still further aspect of the present invention to provide a hydraulic circuit for an automatic transmission utilized in an engine start stop application having a solenoid pump and latching solenoid both communicating with a hydraulic supply between a variable output solenoid and a hydraulic actuator in an automatic transmission which maintains pressure in the hydraulic supply.

It is a still further aspect of the present invention to provide a hydraulic circuit for an automatic transmission utilized in an engine start stop application having a solenoid pump which provides pressurized hydraulic fluid to the exhaust backfill circuits of one or more hydraulic actuators of hydraulic torque transmitting devices in an automatic transmission.

It is a still further aspect of the present invention to provide a hydraulic circuit for an automatic transmission utilized in an engine start stop application having a solenoid pump which provides pressurized hydraulic fluid to the exhaust backfill circuits of one or more hydraulic actuators of clutches and brakes in an automatic transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
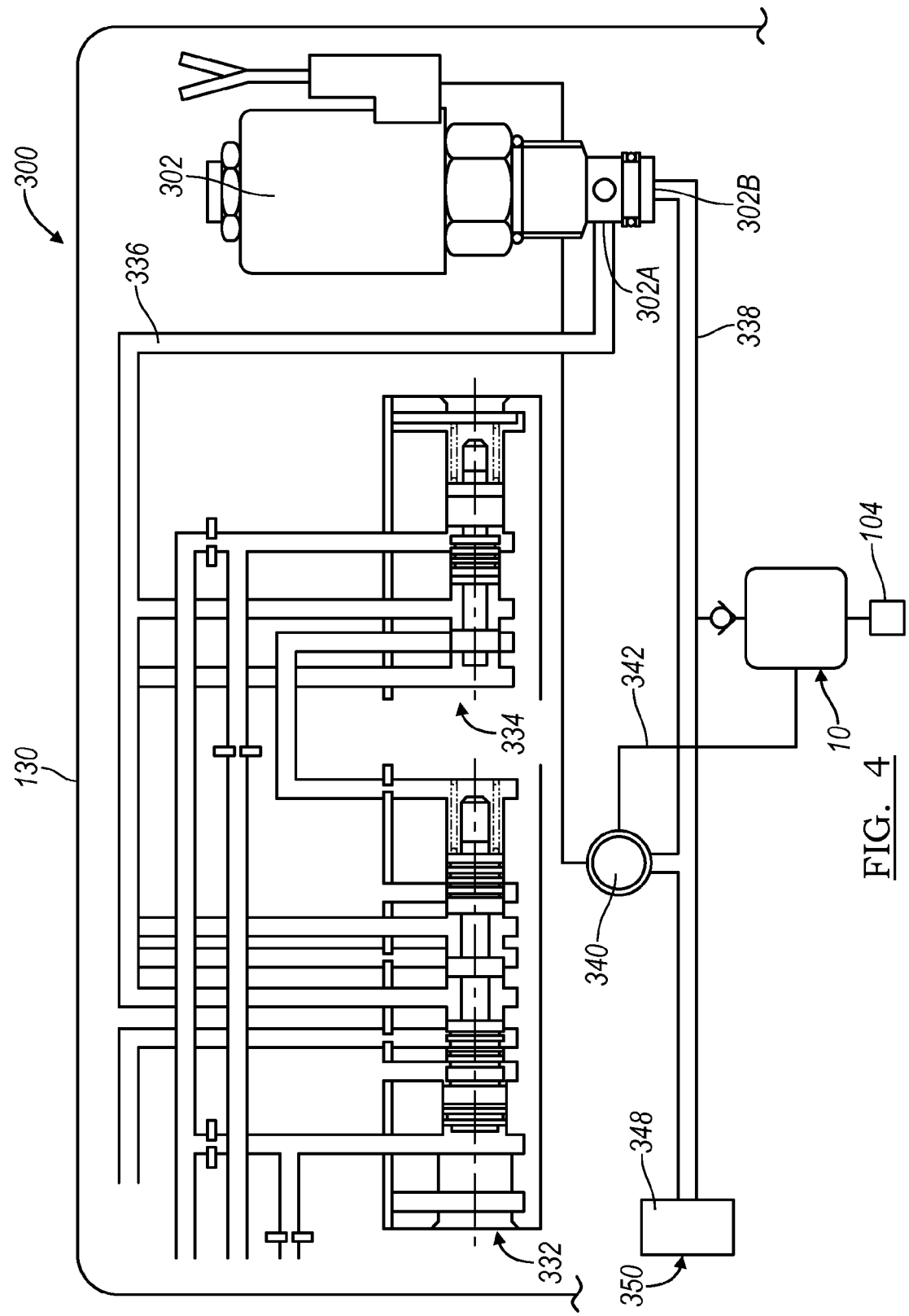
Figure 5:
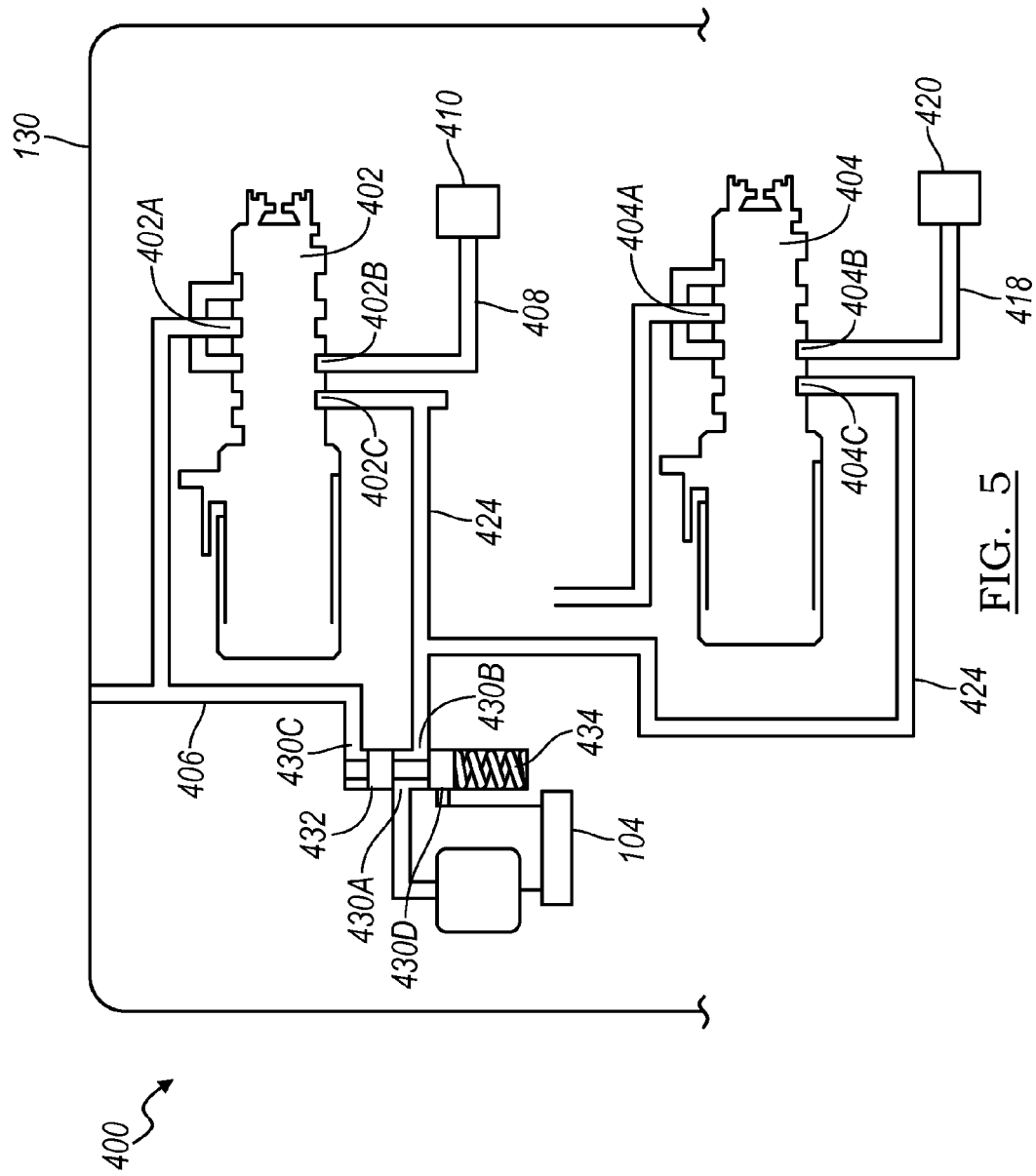

FIG. 4 is a diagrammatic view of a third hydraulic circuit for an automatic transmission including a solenoid pump, a pressure sensor and a latching solenoid valve according to the present invention; and FIG. 5 is a diagrammatic view of a fourth hydraulic circuit for an automatic transmission including a solenoid pump and a control valve in an automatic transmission exhaust backfill circuit according to the present invention.

DETAILED DESCRIPTION

The following description is merely exemplary in nature and is not intended to limit the present disclosure, application, or uses.

Figure 1:
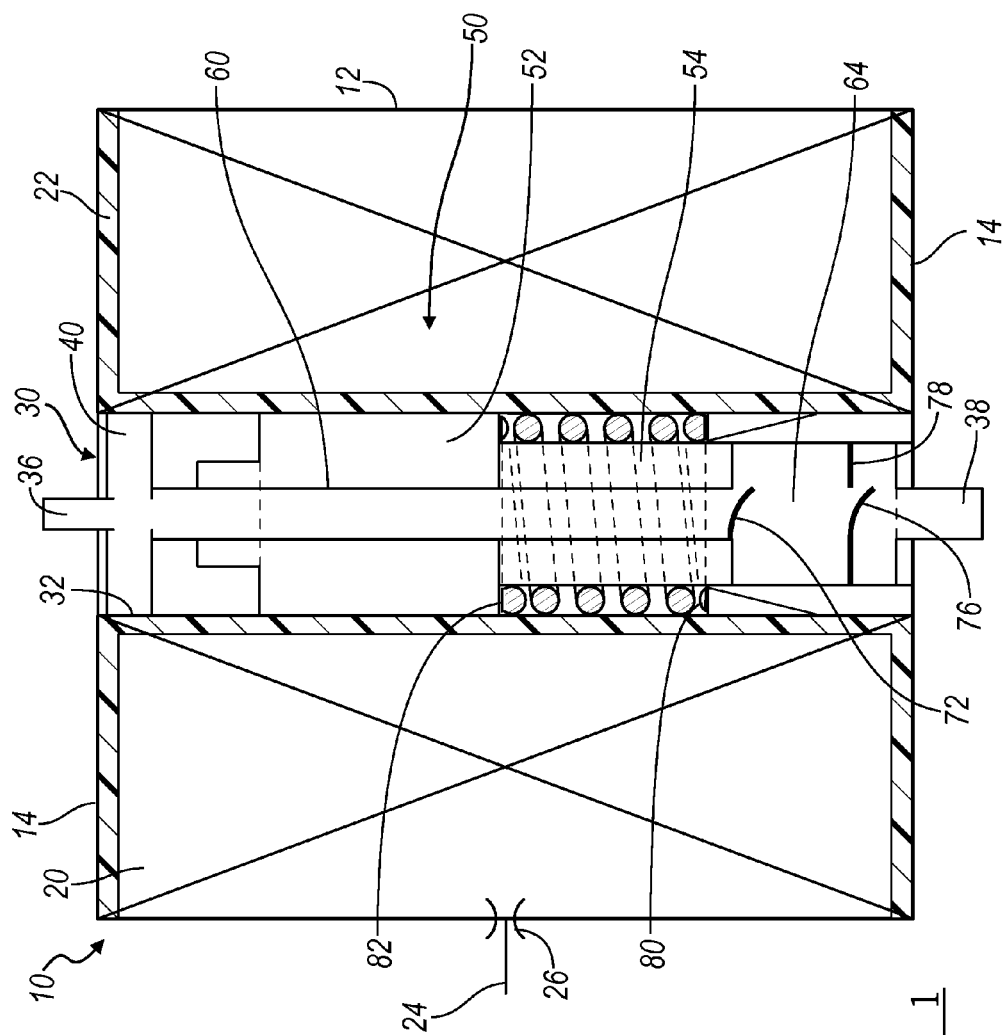
FIG. 1 is a full, sectional view of a solenoid pump utilized in an automatic transmission intended for engine start stop operation according to the present invention in a de-energized (at rest) position or state.

With reference to FIG. 1, a typical and exemplary solenoid pump utilized in the present invention is illustrated and generally designated by the reference number 10. The solenoid pump 10 includes a generally tubular or cylindrical housing 12 which is closed at both ends by circular discs or plates 14. The housing 12 receives an electromagnetic coil 20 which is wound on an insulating bobbin 22. An electrical lead or leads 24 pass through the housing 12 in a suitable insulating feedthrough 26 and provide electrical energy to the electromagnetic coil 20.

Concentrically disposed within the bobbin 22 is a pump assembly 30 which includes a tubular or cylindrical pump body 32. The cylindrical pump body 32 includes an inlet port 36 at one end and an aligned outlet port 38 at the opposite end.

The tubular or cylindrical pump body 32 defines an elongate, hollow pumping chamber 40. Disposed within the pumping chamber 40 is a piston assembly 50. The piston assembly 50 includes a ferrous, i.e., magnetic, plunger or armature portion 52 and may include a non-magnetic member or body portion 54, which may be either metallic or non-metallic. The plunger or armature portion 52 and the member or body portion 54 define a through interior axial passageway 60. The tubular or cylindrical pump body 32 defines a pumping chamber 64 at the lower end of the piston assembly 50.

Between the axial passageway 60 of the piston assembly 50 and the pumping chamber 64 and secured to the end of the non-magnetic member or body portion 54 is a first reed or check valve 72 which is biased against the end of the non-magnetic member or body portion 64 to close off the axial passageway 60. A second reed or check valve 76 is disposed on a circular plate or baffle 78 within the pumping chamber 64 and is biased to close off the pumping chamber 64 and prevent flow from the outlet port 38 into the pumping chamber 64. A compression spring 80, concentrically disposed about the piston assembly 50, engages a shoulder 82 on the plunger or armature portion 52 and biases the piston assembly 50 upwardly as illustrated in FIG. 1, toward the inlet port 36.

The operation of the solenoid pump 10 is straightforward. Assuming the solenoid pump 10 is filled with a fluid such as hydraulic fluid or transmission oil, when the electromagnetic coil 20 is energized, the piston assembly 50 translates downwardly in FIG. 1, drawing in fluid through the inlet port 36 and forcing fluid in the pumping chamber 64 past the second reed or check valve 76 and out the outlet port 38. When the electromagnetic coil 20 is de-energized, the first reed or check valve 72 opens and fluid flows from the axial passageway 60, past the first reed or check valve 72 and into the pumping chamber 64. The pumping cycle is then repeated as the electromagnetic coil 20 is re-energized.

Figure 2:
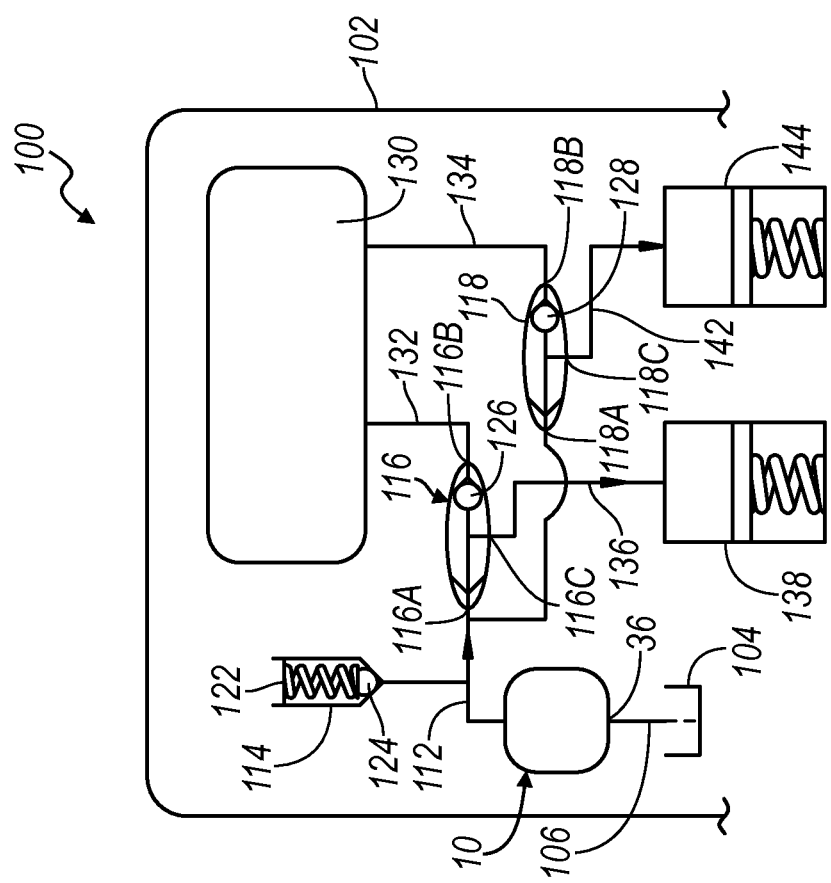
FIG. 2 is a diagrammatic view of a first hydraulic circuit for an automatic transmission including a solenoid pump, a pair of check valves and a pair of hydraulically operated torque transmitting devices according to the present invention.

Referring now to FIG. 2, a first embodiment of a hydraulic control circuit of an automatic transmission 102 is illustrated and generally designated by the reference number 100. The hydraulic control circuit 100 is disposed within and is a portion of the automatic transmission 102 which typically includes a plurality of planetary gear assemblies arranged in tandem and interconnected by a plurality of rigid members, clutches and brakes (all not illustrated). The automatic transmission 102 includes a sump 104 within which hydraulic fluid (transmission oil) collects. The sump 104 is typically and preferably located at the bottom of the automatic transmission 102. An inlet or suction line 106 draws hydraulic fluid from the sump 104 and communicates with the inlet port 36 of the solenoid pump 10 described above. An outlet line 112 is connected to the outlet port 54 of the solenoid pump 10 and communicates with a pressure relief valve 114, a first inlet port 116A of a first two way check or ball valve 116 and a first inlet port 118A of a second two way check or ball valve 118. The pressure relief valve 114 includes a compression spring 122 and a ball or poppet member 124 that opens to release pressure in the outlet line 112 when it exceeds a predetermined value such as 50 to 60 p.s.i. The first two way check or ball valve 116 includes a check ball 126 and the second two way check or ball valve 118 includes a check ball 128.

The automatic transmission 102 also includes a valve body 130 which includes various spool and control valves (not illustrated) which operate and cooperate to selectively provide pressurized hydraulic fluid to various torque transmitting devices, such as clutches and brakes, within the automatic transmission 102. A first output from the valve body 130 in a hydraulic line 132 communicates with a second inlet port 116B of the first two way check or ball valve 116 and a second output in a hydraulic line 134 communicates with a second inlet port 118B of the second two way check or ball valve 118. The first two way check or ball valve 116 also includes an outlet port 116C and a first hydraulic outlet line 136 which communicates with a cylinder of a first hydraulic actuator 138. The first hydraulic actuator 138 is associated with and operates one of two torque transmitting devices, such as clutch or brake assemblies, that must be activated or engaged in the automatic transmission 102 to achieve and maintain first gear. The second two way check or ball valve 118 also includes an outlet port 118C and a second hydraulic line 142 which communicates with a cylinder of a second hydraulic actuator 144. The second hydraulic actuator 144 is associated with and operates the other of two torque transmitting devices, such as clutch or brake assemblies, that must be activated or engaged in the automatic transmission 102 to achieve and maintain first gear.

In operation, when the engine or prime mover is operating, pressurized hydraulic fluid from a main hydraulic pump (not illustrated) driven by the engine or prime mover is supplied to the valve body 130 and directed and supplied as necessary to various hydraulic actuators, such as the hydraulic actuators 138 and 144, to provide sequenced shifts through the available gears of the automatic transmission 102. In this operational mode, the solenoid pump 10 is not operating and the check balls 126 and 128 move to the left in FIG. 2 and block or close off the first inlet ports 116A and 118A. The pressure relief valve 114 relieves pressure as necessary to ensure closing of the inlet ports 116A and 118A. When the prime mover stops and the automatic transmission 102 is in gear, as occurs, for example, when the vehicle is stopped at a traffic light, the main hydraulic pump in the transmission is no longer rotating and thus delivered hydraulic pressure drops. As noted above, however, it is highly desirable that the transmission clutches and/or brakes associated with first gear be maintained in an activated (stroked) or engaged state in order to provide a smooth and prompt launch when the vehicle operator commands it and the prime mover re-starts. Accordingly, when the prime mover shuts down, the solenoid pump 10 is energized and pressurized hydraulic fluid is provided to the first inlet ports 116A and 118A of the first and second check valves 116 and 118. The check balls 126 and 128 thus move to the right and block or close off the second inlet ports 116B and 118B. The pressurized hydraulic fluid is thus provided to the first and second hydraulic actuators 138 and 144, thereby maintaining launch ready engagement of the brake or clutch assemblies associated with first gear.

It should be appreciated and understood that although only two check valves 116 and 118 and two hydraulic actuators 138 and 144 have been illustrated, this being the number of clutches or brakes necessary to engage or achieve first gear in a typical and exemplary automatic transmission, this is by way of illustration and example only. Should a particular automatic transmission have more or fewer clutches or brakes and associated actuators which are necessary to achieve first gear, the number of check valves and hydraulic lines can readily and easily be increased or decreased to accommodate such other automatic transmission configurations.

Figure 3:
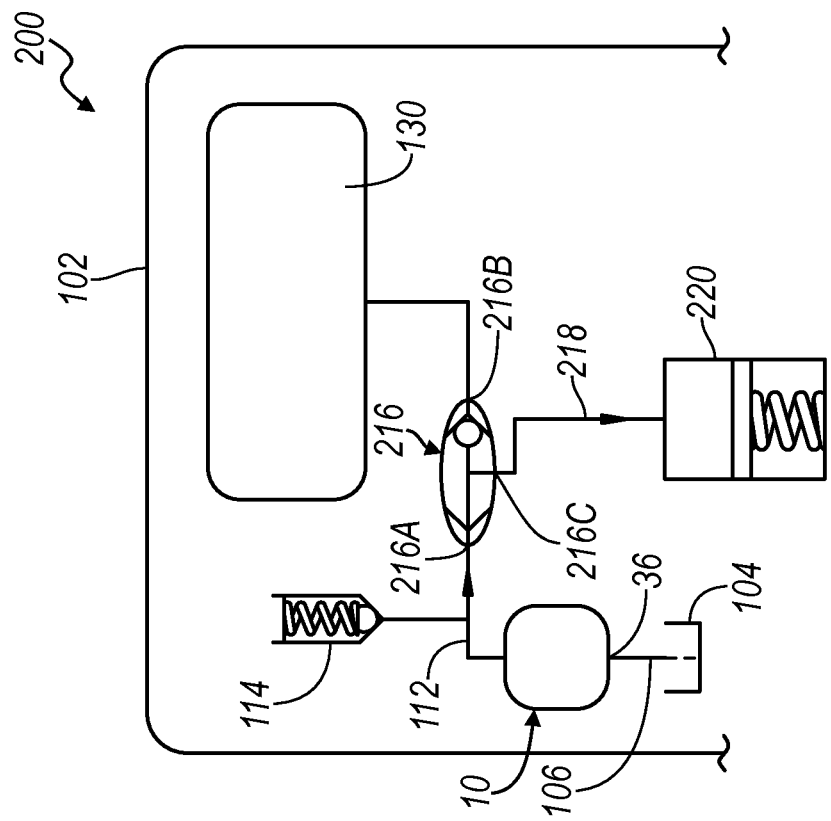
FIG. 3 is a diagrammatic view of a second hydraulic circuit for an automatic transmission including a solenoid pump, a check valve and a hydraulically operated reverse gear torque transmitting device according to the present invention.

Referring now to FIG. 3, a second, similar engine start stop, solenoid pump application and embodiment 200 is illustrated. It is anticipated that, on occasion, a driver may shift from drive to reverse while the prime mover is stopped in traffic, for example, to back up to avoid a stopped or stalled vehicle directly in front. The second embodiment 200 includes the automatic transmission 102, the sump 104, the suction line 106, the solenoid pump 10, the outlet line 112, the pressure relief valve 114, the valve body 130 and a two way check or ball valve 216 having a first inlet port 216A and a second inlet port 216B. The first inlet port 216A of the two way check valve 216 communicates with the outlet line 112 and the second inlet port 216B communicates with an output of the valve body 130. The two way check or ball valve 216 also includes a first outlet 216C and a first hydraulic outlet line 218 which communicates with a cylinder of a reverse hydraulic actuator 220. The reverse hydraulic actuator 220 is associated with and operates a torque transmitting device, such as a clutch or brake, which achieves or engages reverse gear. It should be understood that if two or more clutches must be engaged to achieve reverse and if one of these reverse clutches is also active in drive, then separate solenoid pumps 10 will be required for each one of the clutches in order to have engine start stop in both drive and reverse.

Once again, in operation, while the prime mover is operating, conventional control of the reverse hydraulic actuator 220 is achieved by the valve body 130, through the two way check valve 216, the pressure relief valve 114 ensuring that pressure is relieved in the hydraulic outlet line 112 so that the check valve 216 can properly and fully close. When the prime mover is stationary and reverse gear is selected, the solenoid pump 10 in energized and the outlet line 218 and the reverse hydraulic actuator 220 begin to be filled and pressurized and stroked such that reverse gear will be fully or substantially fully engaged when the prime mover re-starts.

It should be appreciated that both the embodiments of FIGS. 2 and 3 may be utilized together in one automatic transmission 102, in which case, only one solenoid pump 10 would typically be utilized.

Referring now to FIG. 4, a third application and embodiment 300 of a solenoid pump 10 in an automatic transmission 102 for an engine start stop application is illustrated. A somewhat less critical operational issue in engine start stop applications relates to the loss of pressure in hydraulic circuits utilizing latching solenoids valves which close off or isolate a circuit to maintain hydraulic pressure in the circuit for a period of time when the prime mover is stopped and the transmission is in gear. While the latching solenoid valve may provide positive and complete circuit closure and isolation, small but finite leaks in the hydraulic circuit at interconnections and within the hydraulic actuator may amount to as much as 5 ml/minute. Over even a relatively short period of time, such leaks may result in a reduction or total loss of pressure in a circuit, thereby impairing vehicle launch and operation until full pressure has been restored.

The third embodiment 300 includes a latching solenoid valve 302 that may be disposed within the valve body 130 with other spool or control valves 332 and 334, as noted above. A control supply line 336 from the spool or control valves 332 and 334 communicates with and supplies pressurized hydraulic fluid to an inlet port 302A of the latching solenoid valve 302. When the latching solenoid 302 is de-energized, such pressurized hydraulic fluid is provided to an outlet port 302B and a hydraulic line 338. When the latching solenoid valve 302 is energized, it cuts off the flow of pressurized hydraulic fluid to the outlet port 302B. A solenoid pump 10, as described above, which draws hydraulic fluid from the sump 104 is also in fluid communication with hydraulic line 338. A latching solenoid pressure switch 340 which closes on pressure drop and opens on pressure rise receives electrical power from the circuit that energizes the latching solenoid 302 and selectively provides it to the solenoid pump 10 through an electrical conductor 342 when pressure in the hydraulic line 338 falls below a predetermined value. The hydraulic line 338 terminates in a cylinder 348 of a hydraulic actuator 350 associated with a torque transmitting device, such as a clutch or brake, that must or should be maintained in a pressurized (stroked) condition during periods of stopped prime mover operation while the transmission is in gear, in order to ensure smooth, prompt and acceptable vehicle launches.

Referring now to FIG. 5, a fourth embodiment 400 of a solenoid pump 10 in an automatic transmission 102 for an engine start stop application is illustrated. Here, the solenoid pump 10 is utilized in the exhaust backfill hydraulic circuit.

Providing pressurized hydraulic fluid flow to a plurality of actuators also involves exhausting such flow through control valves and return lines to the sump 104 of the transmission 102. In order to achieve predicable and repeatable operation, it is known that such exhaust or return circuits should not be allowed to operate or return to ambient pressure but should be maintained at a certain minimum pressure, on the order of 5 p.s.i. which allows for the hydraulic circuit to be filled with hydraulic fluid. Once again, in engine start stop applications, maintaining this desired minimum exhaust backfill pressure may not be possible inasmuch as the prime mover which drives the main transmission hydraulic pump will, as noted above, often not be operating while the transmission is still in gear. During engine start stop operation, higher pressure is desired to stroke the clutch pistons against their respective return springs which requires a newer pumping source when the engine or the prime mover and hence the transmission pump is off.

In FIG. 5, the valve body 130 is seen to include a first variable force solenoid (VFS) valve 402 and a second variable force solenoid (VFS) valve 404. It will be appreciated that the illustration of two variable force solenoid valves is for purposes of description and example only and that just one or more than two variable force solenoid valves may be utilized in the present invention. Moreover, different solenoid valve configurations or types, other than variable force, may be utilized in the present invention. Each of the variable force solenoid valves 402 and 404 includes at least one inlet port: the first variable force solenoid valve 402 includes an inlet port 402A and the second variable force solenoid valve 404 includes an inlet port 404A which are both fed from a pressurized hydraulic supply line 406. The first variable force solenoid valve 402 also includes a controlled outlet port 402B which communicates through a hydraulic line 408 with a first hydraulic actuator 410 associated with one of the torque transmitting devices, such as clutches or brakes, typically associated with first gear. The second variable force solenoid valve 404 also includes a controlled outlet port 404B which communicates through a hydraulic line 418 with a second hydraulic actuator 420 associated with another of the clutches or brakes typically associated with first gear.

Each of the variable force solenoid valves 402 and 404 includes at least one exhaust port: the first variable force solenoid valve 402 includes an exhaust port 402C and the second variable force solenoid valve 404 includes an exhaust port 404C. Both of the exhaust ports 402C and 404C communicate with an exhaust backfill hydraulic line 424. The exhaust backfill hydraulic line 424 terminates at an outlet port 430B of a control valve 430. The control valve 430 includes a valve spool 432, an inlet port 430A which is in communication with the output of a solenoid pump 10, as described above, a control port 430C which is in fluid communication with the hydraulic supply line 406 and an exhaust port 430D which returns hydraulic fluid to the sump 104.

When hydraulic pressure in the line 406 drops below a predetermined value, typically because the prime mover has stopped, and the transmission is in gear, the solenoid pump 10 is energized and the spool 432 which is biased by a compression spring 434 moves upward, closing off the exhaust port 430D and providing fluid communication between the inlet port 430A and the outlet port 430B, thereby providing pressurized hydraulic fluid from the solenoid pump 10 to the exhaust backfill hydraulic line 424 to maintain the desired and minimum necessary hydraulic pressure in the exhaust backfill line 424 to ensure suitable, smooth and repeatable vehicle launches. When the prime mover restarts and the main transmission hydraulic pump again begins operating, the pressure in the line 406 will translate the spool 432 downwardly, closing off the inlet port 430A and providing communication between the outlet port 430B and the exhaust port 430D. When hydraulic pressure in the line 406 is at or above a predetermined system threshold pressure value, the variable force solenoid valves 402 and 404 may again be energized to control engagement of the hydraulic actuators 410 and 420.

Once again, it should be appreciated that although only two solenoid control valves, the variable force solenoid valves 402 and 404 are described above, the incorporation of a solenoid pump 10 in an exhaust backfill circuit of an automatic transmission 102 may be associated with only one solenoid valve or more than two solenoid valves. Moreover, the incorporation of a solenoid pump 10 in an exhaust backfill circuit of an automatic transmission 102 may be accompanied by incorporation of additional solenoid pumps 10 as described above with respect to the other embodiments 100, 200 and 300.

The foregoing description of the invention is merely illustrative and exemplary in nature and variations that do not depart from the gist of the invention are intended to be within the scope of the invention. Such variations are not to be regarded as a departure from the spirit and scope of the invention.

What is claimed is:

1. A hydraulic circuit for an automatic transmission comprising, in combination,
    a transmission sump for receiving hydraulic fluid,
    at least one hydraulic actuator having a cylinder and associated with a torque transmitting device in such automatic transmission,
    a control valve for selectively providing pressurized hydraulic fluid to said cylinder of said actuator,
    a solenoid pump having an inlet in fluid communication with said sump and a fluid outlet, and
    a two way check valve having a first port in fluid communication with said control valve, a second port in fluid communication with said fluid outlet of said solenoid pump and an outlet port in fluid communication with said at least one hydraulic actuator.

2. The hydraulic circuit of claim 1 wherein said hydraulic actuator is associated with providing first gear.

3. The hydraulic circuit of claim 1 wherein said two way check valve is a pressure actuated spool valve.

4. The hydraulic circuit of claim 1 wherein said two way check valve is a two position electric valve.

5. The hydraulic circuit of claim 1 wherein said control valve is disposed in a valve body.

6. The hydraulic circuit of claim 1 further including a pressure sensor in fluid communication with said outlet of said solenoid pump.

7. The hydraulic circuit of claim 1 further including a pressure relief valve disposed in fluid communication with said fluid outlet of said pump and said second port of said two way check valve.

8. The hydraulic circuit of claim 1 wherein said two way check valve includes a ball check disposed in a housing.

9. A hydraulic circuit for an automatic transmission comprising, in combination,
    a sump for collecting hydraulic fluid,
    a solenoid pump having a fluid inlet communicating with said sump and a fluid outlet,
    at least one hydraulic actuator having a cylinder and associated with a torque transmitting device in such automatic transmission,
    a control valve for selectively providing pressurized hydraulic fluid to said cylinder of said actuator, and a two way check valve having a first port in fluid communication with said control valve, a second port in fluid communication with said fluid outlet of said solenoid pump and an outlet port in fluid communication with said cylinder of said at least one hydraulic actuator.

10. The hydraulic circuit for an automatic transmission of claim 9 wherein said hydraulic actuator is associated with providing first gear.

11. The hydraulic circuit for an automatic transmission of claim 9 wherein said two way check valve is a pressure actuated spool valve.

12. The hydraulic circuit for an automatic transmission of claim 9 wherein said valve is a two position electric valve.

13. The hydraulic circuit for an automatic transmission of claim 9 further including a pressure relief valve disposed in fluid communication with said fluid outlet of said pump and said second port of said two way check valve.

14. The hydraulic circuit for an automatic transmission of claim 9 wherein said two way check valve includes a ball check disposed in a housing.

15. A hydraulic assembly for engine start stop automatic transmissions, comprising, in combination,
a transmission sump for receiving and collecting hydraulic fluid,
a solenoid pump having a fluid inlet in communication with said sump and a fluid outlet,
a hydraulic actuator having a piston disposed within a cylinder,
a torque transmitting device acted upon by said piston,
a hydraulic valve for selectively providing hydraulic fluid,
a two way check valve having a first port in fluid communication with said hydraulic valve and a second port in fluid communication with said fluid outlet of said solenoid pump and an outlet port in fluid communication with said hydraulic actuator and,
a pressure relief valve disposed in fluid communication with said fluid outlet of said pump and said second port of said check valve.

16. The hydraulic assembly for engine start stop automatic transmissions of claim 15 wherein said torque transmitting device is one of a clutch and a brake.

17. The hydraulic assembly for engine start stop automatic transmissions of claim 15 wherein said hydraulic valve is an on-off solenoid valve.

18. The hydraulic assembly for engine start stop automatic transmissions of claim 15 wherein said torque transmitting device is a clutch associated with engaging first gear.

* * * * *